J. M. MEREDITH, Jr.
FISH DRESSING MACHINE.
APPLICATION FILED NOV. 19, 1907.
926,582.
Patented June 29, 1909.
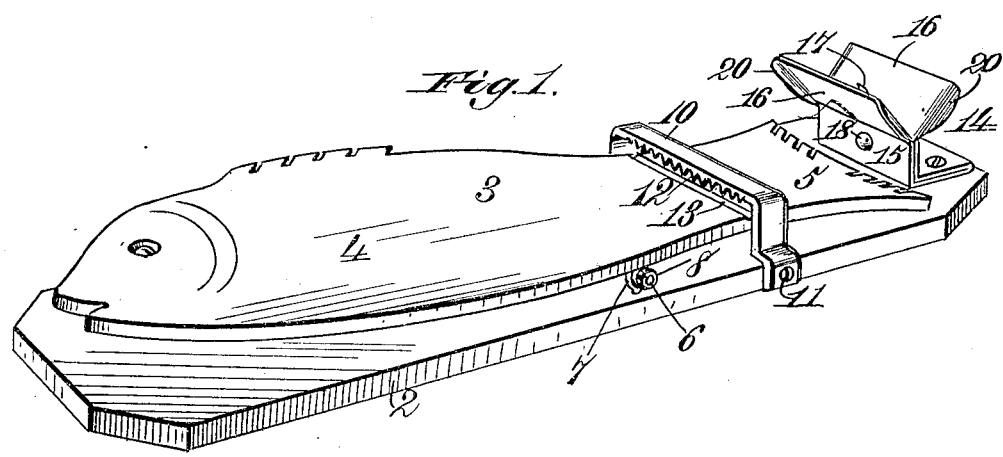
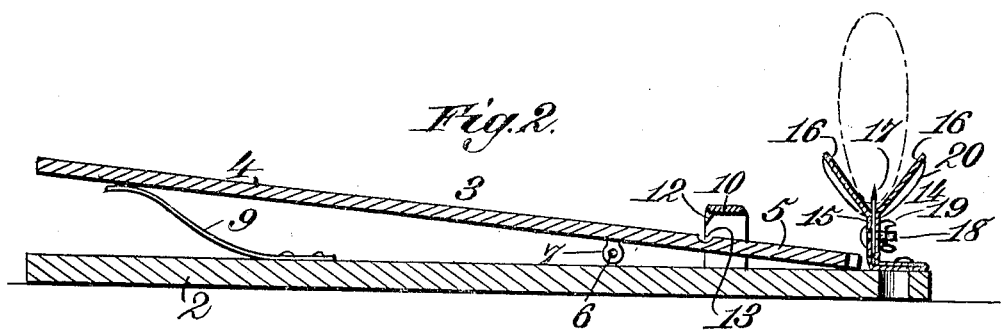
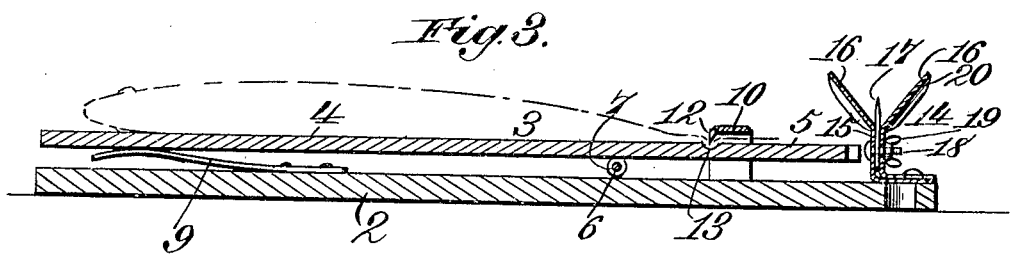
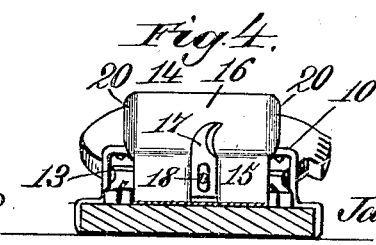
Witnesses.
Robert Everitt.
C. A. Rowe.
Inventor:
Jaquelin M. Meredith Jr.
By James L. Norris
Atty.

UNITED STATES PATENT OFFICE.

JAQUELIN M. MEREDITH, JR., OF NORFOLK, VIRGINIA, ASSIGNOR OF ONE-HALF TO JAMES W. GEROW, OF LYNCHBURG, VIRGINIA.

FISH-DRESSING MACHINE.

No. 926,582.   Specification of Letters Patent.   Patented June 29, 1909.

Application filed November 19, 1907. Serial No. 402,900.

*To all whom it may concern:*

Be it known that I, JAQUELIN M. MEREDITH, Jr., a citizen of the United States, residing at Norfolk, in the county of Norfolk and State of Virginia, have invented new and useful Improvements in Fish-Dressing Machines, of which the following is a specification.

This invention relates to fish dressing machines, one of the features of the invention comprising a movable fish support and a jaw, the two parts being coöperative to clamp a fish during scaling thereof, either by hand or power. The said movable fish support may be of any desirable character, although it is preferably mounted for swinging movement in such a manner as to present two branches, on one of which the fish is wholly sustained, while the other of which directly coöperates with a jaw such as that to which reference has been made. I prefer to provide, in connection with said support, means for positively moving the same into an inoperative position and, although said means may be of any desirable character, it preferably consists of spring means adapted to act suitably against said support for the purpose set forth.

Another feature of the invention consists in a slitting means whereby the fish, after being scaled, can be cleanly and smoothly slit or cut in a lengthwise direction prior to evisceration.

In the drawings accompanying and forming a part of this specification I have shown in detail one simple and effective form of embodiment of the invention which, to enable those skilled in the art to practice the same, will be set forth in detail in the following description, while the novelty of the invention will be included in the claims succeeding said description.

Referring to said drawings: Figure 1 is a perspective view of a fish dressing machine involving my invention. Figs. 2 and 3 are sectional views of the same, showing the said fish support in its inoperative and operative positions respectively. Fig. 4 is a transverse section, the section being taken through the slitting means hereinafter particularly described.

Like characters refer to like parts throughout the several figures of the drawings.

A machine embodying my invention includes in its make-up a suitable bed or foundation member which may be of any desirable character, this depending upon whether the fish is to be dressed by hand or power. The base or foundation member illustrated in the drawings consists of a plate or board as 2 which may be of any desirable size. The fish support likewise may be of any desirable form; that shown in the drawings is designated by 3 and it consists of a leverlike part fulcrumed between its ends to present a long branch 4 and a short branch 5. This, however, is not essential. The fish support may, if desired, and as shown in Fig. 1, follow the outline of a fish. The pivot for the fish support 3 is designated by 6 and, in the present case, it extends through the eyes of screw-eyes designated in each case by 7. There may be any number of these screw-eyes, for example, four, the shanks of two of them, when such number is present, being screwed into the under side of the support 3, while the shanks of the other two are screwed into the upper side of the base or foundation member 2. The pivot pin 6 may be held in place in any desirable manner, for example, by nuts as 8, one of which is shown in Fig. 1. Other means might, of course, be utilized for sustaining the support 3 for swinging motion, although that set forth is of a simple and inexpensive character. The extreme rear end or tail of the swinging support 3, when the latter is in its inoperative position, as shown in Fig. 2, is in contact with or substantially in contact with the upper side of the bed 2, and this relation may be maintained in any desirable manner, for example, by spring means such as the spring 9 fastened at one end to the upper side of the bed 2, and the other or free end of which is adapted to engage against the under surface of the long branch 4 to obtain the result set forth, at which time the support 3 stands at a slight downward angle commencing at the head or forward end thereof.

A bridge-piece is shown at 10, said bridge-piece being represented as being approximately of yoke-form, the substantially upright or end members being connected at or near their bases in any desirable manner, for example, by screws 11, to the bed 2. The transverse portion of this bridge or yoke 10 extends across the upper side of the swinging support 3 and is toothed or serrated, as at 12. This bridge-piece or yoke 10 is stationary with respect to the support 3 and constitutes a jaw coöperative with the former, to clamp and solidly hold a fish during the scaling operation. Normally or when the support 3 is in its inoperative position, as indicated in Fig. 2, the upper or working surface of said support is out of contact with the working or serrated edge of the bridge 10, so that the tail of a fish can be inserted between the support and bridge. The major part of the fish or practically all of the body is sustained upon the longer branch 4 of the support 3, so that, as soon as the fish is fully positioned on the support, the weight of the body thereof is ordinarily ample enough to swing down the long branch 4 and the short branch 5 upward to clamp the tail of the fish between said support and bridge or jaw 10. Should the weight of the body of the fish be not sufficient to thus effect a clamping thereof, pressure can be exerted by the hand downwardly on the long branch 4, to obtain the desired result, namely, the solid clamping of the fish during the scaling thereof. The short branch 5 of the support 3, which in the present case directly coöperates with the bridge or jaw 10, is shown as having formed across its upper surface a groove or channel 13 into which a part of the tail of the fish can be pressed as the support 3 is moved in the manner indicated, thereby preventing all possibility of the fish moving when held conjointly by the support 3 and jaw 10. Of course, it is not essential to use this groove or channel, nor is it necessary that the holding jaw be serrated or toothed. I find, however, that the presence of the groove and the teeth is quite desirable and effective in practice. After one side of the fish is scaled the other side will be presented upward to be also scaled.

In Fig. 3 a fish is shown as resting upon the support 3, the preponderance of weight of said fish being upon the long branch 4 thereof, so as to effect the clamping or holding action to which allusion has been made. At this time the spring 9 is under tension. When the fish is lifted preparatory to its being turned over, the weight thereof is, of course, removed from the long branch 4 of the support, so that the spring 9, then under tension, becomes immediately effective for moving the support 3 to a fish releasing or inoperative position. In other words, the support is automatic in its operation as soon as the fish is taken therefrom, so that no manipulation of the support is necessary to effect the release of the tail of such fish. As indicated, if the weight of the fish is not sufficient to maintain the clamping relation, additional pressure by the hand or otherwise can be brought to bear upon the support to solidly clamp such fish.

After the fish has been scaled, it is slit, and for this purpose a slitting means such as that denoted in a general way by 14 may be provided. The fish slitting means 14 may, if desired and as shown in the drawings, consist of sheet metal bent to present a substantially L-shaped body 15 and two outwardly diverging flanges 16, said flanges presenting collectively a trough to receive between them a fish, as indicated in Fig. 2. The horizontal portion of the L-shaped body 15 may be fastened to the base 2 in any desirable manner, while between the sides or parts of the vertical portion of said body the shank of a slitting knife as 17 may be fitted, said knife being held in place by a screw as 18 extending through the vertical portions of the body 15 and also through a vertically elongated slot in the shank of said knife, the screw being equipped with a thumb-nut as 19 to firmly clamp said sides together and securely retain the knife in a vertically adjusted position, which adjustment is possible in view of the presence of the vertically elongated slot in the shank thereof. The working portion of the knife 17 is curved in a direction opposite that taken by the fish during the slitting operation, so as to facilitate the cut. The two flanges 16 present in effect a trough and there is a stationary knife in the bottom of and projecting upward from the same, this stationary knife cutting the fish as the same is drawn in a longitudinal direction between the two coacting flanges 16. The opposite ends of said flanges are provided with outwardly curved lips as 20 which prevent the cutting of the fish as the same is drawn through the trough presented collectively by said two flanges.

What I claim is:

1. In a fish dressing machine, the combination of a movable fish support pivoted between its ends, a stationary jaw extending transversely of said support between one end and the pivot thereof and coöperating with said support to clamp a fish, and means acting upon said support at its other end to hold the same normally in inoperative position.

2. In a fish dressing machine the combination of a jaw, a swinging fish support one branch of which coöperates with the said jaw to clamp a fish, and means acting against the other branch of said support to move the latter into an inoperative position.

3. In a fish dressing machine the combination of a jaw, a pivotally mounted fish support having long and short branches, the short branch of which directly coöperates with said jaw to clamp a fish, and a spring to act against the long branch to move the support to its inoperative position.

4. In a fish dressing machine the combination of a bed, a fish support pivotally connected with said bed to present long and short branches, a jaw extending across the upper side of the support and connected with the bed, the support and jaw coöperating to clamp a fish, and a spring connected with the bed and acting against the support to move the same to its inoperative or fish-releasing position.

5. In a fish dressing machine, in combination, a fish support pivoted between its ends, a clamping jaw coöperating with the rearward portion of said support and a spring acting upon the forward portion of said support to move the same upwardly on its pivotal axis.

6. In a fish dressing machine in combination, a fish support pivoted between its ends and a stationary clamping jaw overlying and coöperating with the portion of said support rearward of the pivot thereof and means for holding said support with its rear portion normally spaced from said jaw.

7. In a fish dressing machine in combination, a fish support comprising a bed, a supporting member pivotally mounted on the bed, and a stationary clamping jaw secured to the bed and coöperating with and extending transversely over the portion of said member rearwardly of the pivot thereof.

In testimony whereof I have hereunto set my hand in presence of two subscribing witnesses.

JAQUELIN M. MEREDITH, Jr.

Witnesses:
HEATH SUTHERLAND,
CHAS. S. HYER.